US006785588B2

United States Patent
Dimitri et al.

(10) Patent No.: US 6,785,588 B2
(45) Date of Patent: Aug. 31, 2004

(54) METHOD TO PROVIDE FAILOVER PROTECTION TO A DATA STORAGE AND RETRIEVAL SYSTEM

(75) Inventors: Kamal Emile Dimitri, Tucson, AR (US); John Edward Kulakowski, Tucson, AR (US); Rodney Jerome Means, Tucson, AR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/091,668

(22) Filed: Mar. 5, 2002

(65) Prior Publication Data

US 2003/0171844 A1 Sep. 11, 2003

(51) Int. Cl.[7] .............................................. G06F 7/00
(52) U.S. Cl. ...................................... 700/214; 700/255
(58) Field of Search ................................. 700/214, 218, 700/226, 248, 249, 255; 369/30, 33, 34, 36, 178

(56) References Cited

U.S. PATENT DOCUMENTS

| 4,797,753 A | 1/1989 | Montgomery ................. 360/27 |
| 5,164,928 A | 11/1992 | Oliver et al. .................. 369/34 |
| 5,602,821 A | 2/1997 | McPherson et al. ......... 369/178 |
| 5,993,045 A | 11/1999 | Schmidtke et al. ..... 364/478.06 |
| 5,993,395 A | 11/1999 | Shulze ......................... 369/34 |
| 6,038,490 A | * 3/2000 | Dimitri et al. ............... 700/214 |
| 6,154,852 A | 11/2000 | Amundson et al. ............ 714/5 |
| 6,230,075 B1 | * 5/2001 | Nishijo et al. ............... 700/214 |
| 6,304,524 B1 | * 10/2001 | Gallo et al. .............. 369/30.28 |
| 6,493,604 B1 | * 12/2002 | Kappel et al. .............. 700/213 |
| 6,591,164 B1 | * 7/2003 | Plutt et al. .................. 700/245 |

FOREIGN PATENT DOCUMENTS

| JP | 3-241563 | 10/1991 | ........... G11B/17/26 |
| JP | 2000-285566 | 10/2000 | ........... G11B/17/22 |

* cited by examiner

Primary Examiner—Khoi H. Tran
(74) Attorney, Agent, or Firm—Dale F. Regelman

(57) ABSTRACT

An accessor moveably disposed in a data storage and retrieval system, where that accessor includes an accessor controller, a work queue stored in the accessor controller, and an inventory stored in the accessor controller. Applicants' work queue comprises each work request provided to the data storage and retrieval system, and each work entry created by the accessor controller to perform a work request. Work requests may be received from attached host computer systems, from an operator input station, and/or from an import/export controller. A data storage and retrieval system which includes at least two of Applicant's accessors. A method to provide failover protection to Applicant's data storage and retrieval system in the event of a failure of one or more of Applicant's accessors.

17 Claims, 12 Drawing Sheets

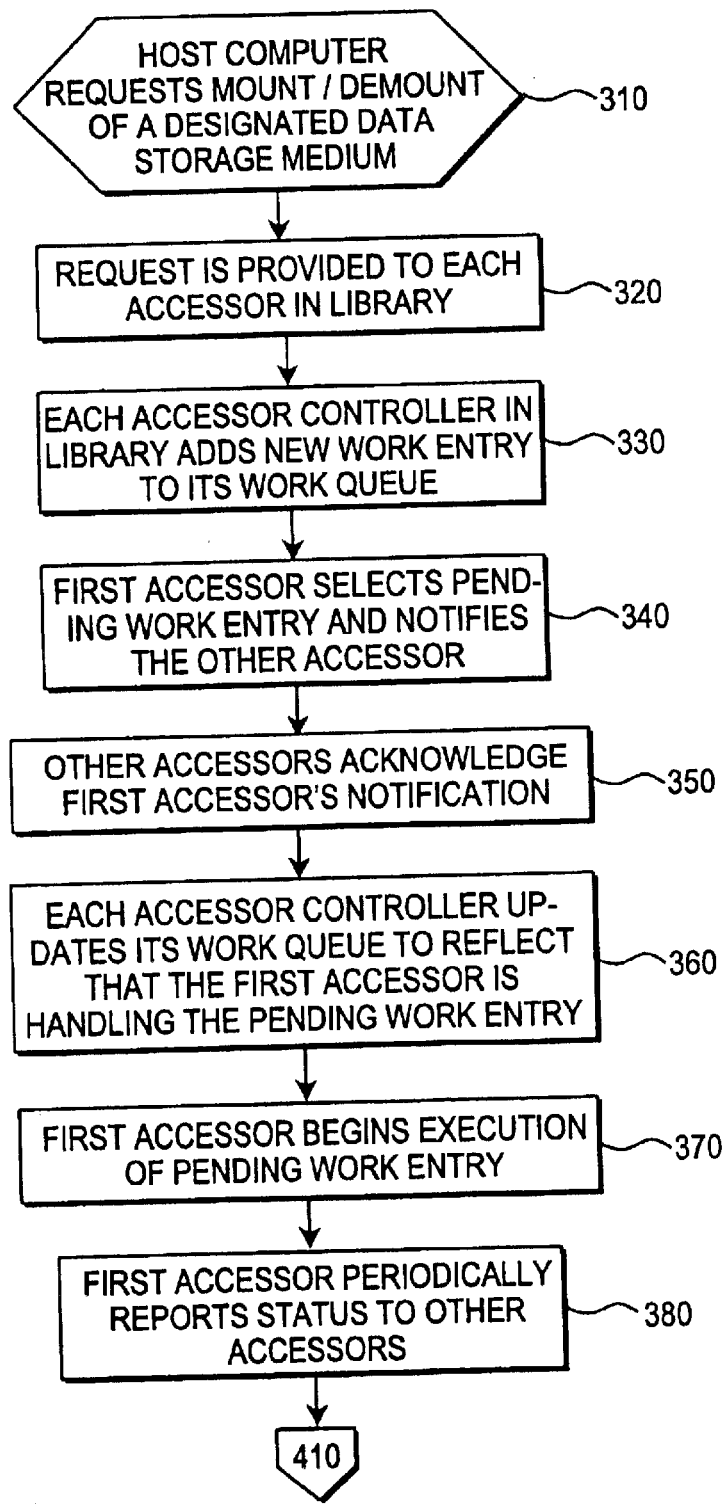

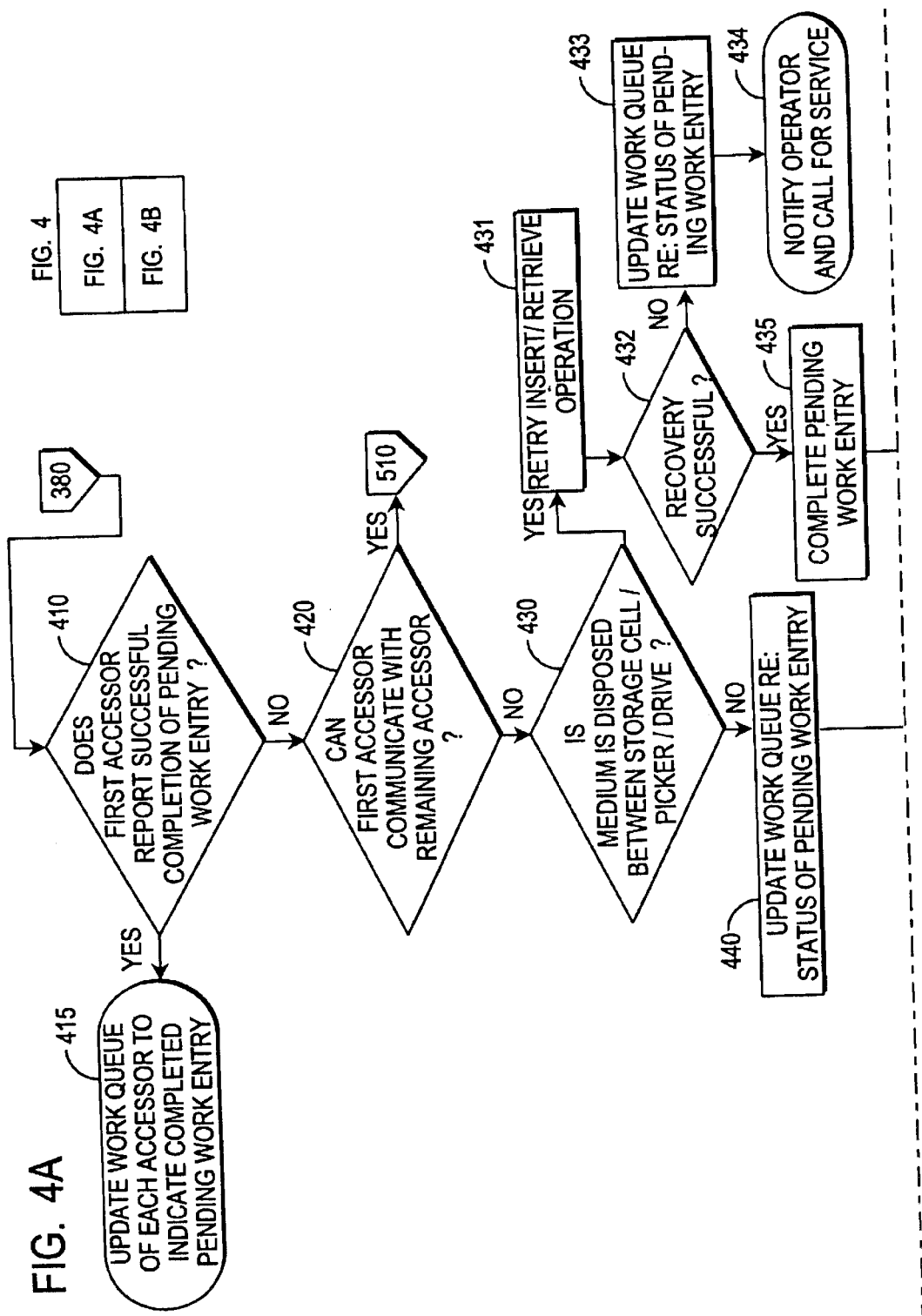

| FIG. 5A |
| FIG. 5B |

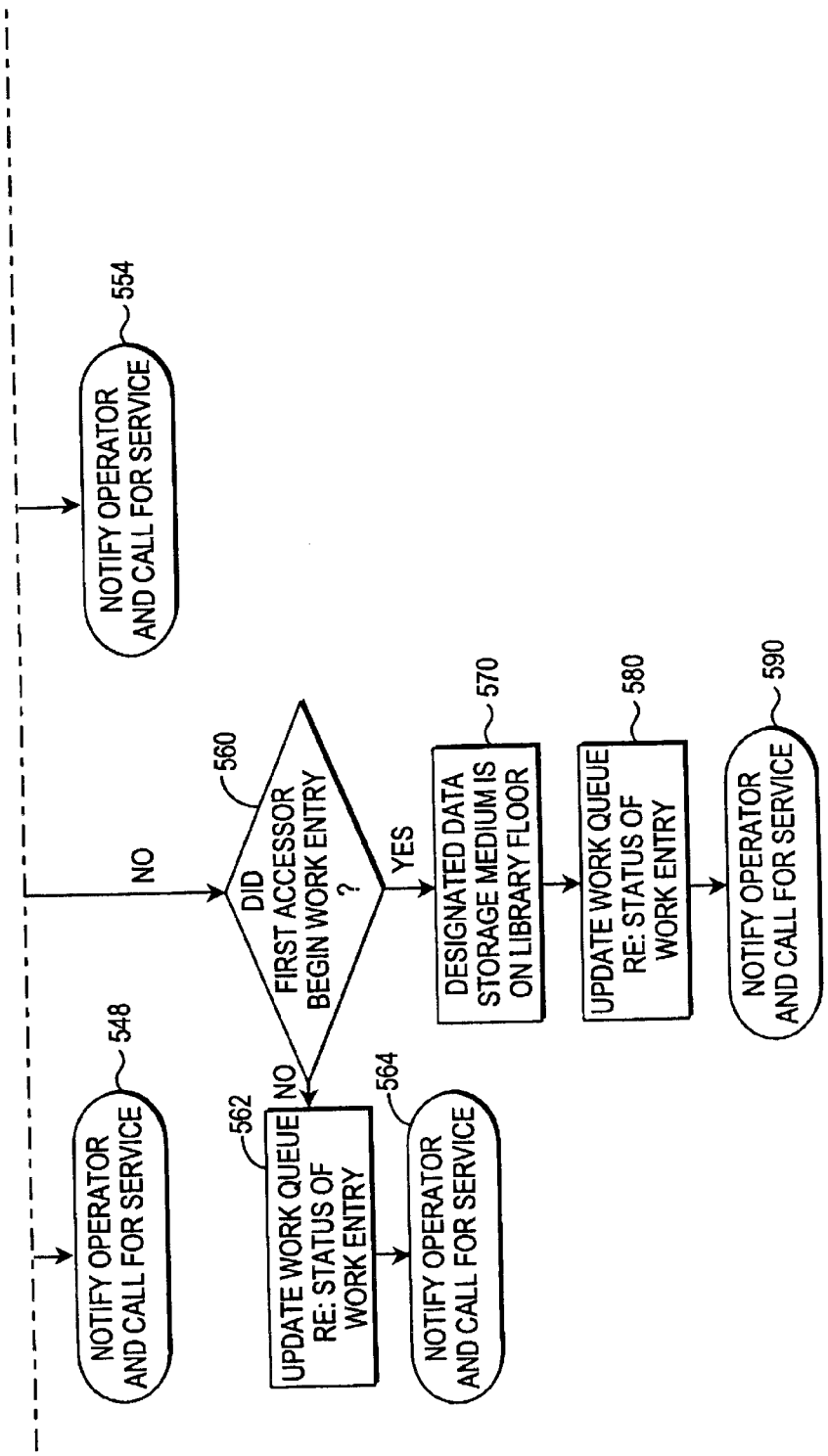

METHOD TO PROVIDE FAILOVER PROTECTION TO A DATA STORAGE AND RETRIEVAL SYSTEM

FIELD OF THE INVENTION

Applicant's invention relates to a method to provide failover protection to a data storage and retrieval system in the event of the failure of a robotic accessor moveably disposed therein.

BACKGROUND OF THE INVENTION

Automated media storage libraries are known for providing cost effective access to large quantities of stored media. Generally, media storage libraries include a large number of storage slots on which are stored portable data storage media. One (or more) accessors typically access the data storage media from the storage slots and deliver the accessed media to a data storage device for reading and/or writing information on the accessed media. Suitable electronics operate the accessor(s) and operate the data storage device (s) to provide information to, and/or to receive information from, one or more host computers.

In certain embodiments, the storage slots are arranged in a planar orthogonal arrangement forming a "wall" of storage slots for holding data storage media. The plane may be a flat plane, or may be a cylindrical plane. In certain embodiments, two "walls" of storage slots may be provided on either side of the one or more accessors.

A number of different companies manufacture automated media storage libraries today, each model displaying various different features. One example is the IBM 3584 Media Storage Library. Some of the automated media storage libraries have dual or multiple accessors to provide a level of redundancy and to enhance performance.

SUMMARY OF THE INVENTION

Applicants' invention includes an accessor moveably disposed in Applicant's data storage and retrieval system, where that data storage and retrieval system is capable of communicating with one or more host computers. Applicant's accessor includes an accessor controller containing, among other things, a work queue comprising a computer database which includes information regarding one or more work requests made by one or more host computers, or by the system operator, or by system's I/O controller. Each accessor controller creates a work entry corresponding to each work request received. Each such work entry includes information which includes, for example, the time the work request was received, the operations required to complete that work request, the accessor handling the work request, and the status of that work request.

Applicant's invention further includes a data storage and retrieval system which comprises at least two of Applicant's accessors. Applicants' data storage and retrieval system further includes a data and control network that interconnects, inter alia, each of Applicants' accessors moveably disposed in Applicants' data storage and retrieval system.

Applicants' invention further includes a method to provide failover protection to Applicants' data storage and retrieval system in the event of a failure of one of Applicant's accessors, where that data storage and retrieval system includes a data and control network, one or more portable data storage media, and two or more of Applicant's accessors. Applicant's method includes the steps of receiving a work request from a host computer, creating a pending work entry comprising that move request, communicating notification by one of the accessors, i.e. a first accessor, to the other accessors, i.e. the one or more remaining accessors, that the first accessor is handling the pending work entry, acknowledging that notification by the remaining accessors, initiating that pending work entry, reporting the status of the pending work entry, and updating the work queue disposed in each accessor to indicate the completion of the work entry.

Applicants' invention further includes a data storage and retrieval system which includes a computer useable medium having computer readable program code disposed therein for implementing Applicant's method to provide failover protection to Applicant's data storage and retrieval system in the event of a failure of one of Applicant's accessors.

BRIEF DESCRIPTION OF THE DRAWINGS

The invention will be better understood from a reading of the following detailed description taken in conjunction with the drawings in which like reference designators are used to designate like elements, and in which:

FIG. 3 is a flowchart summarizing the initial steps in Applicant's method;

DETAILED DESCRIPTION OF THE PREFERRED EMBODIMENTS

Referring to the illustrations, like numerals correspond to like parts depicted in the figures. The invention will be described as embodied in an automated data storage and retrieval subsystem for use in a data processing environment. The following description of Applicant's apparatus and method is not meant, however, to limit Applicant's invention to either tape libraries, or to data processing applications, as the invention herein can be applied to data storage and retrieval systems in general.

Figure 1:
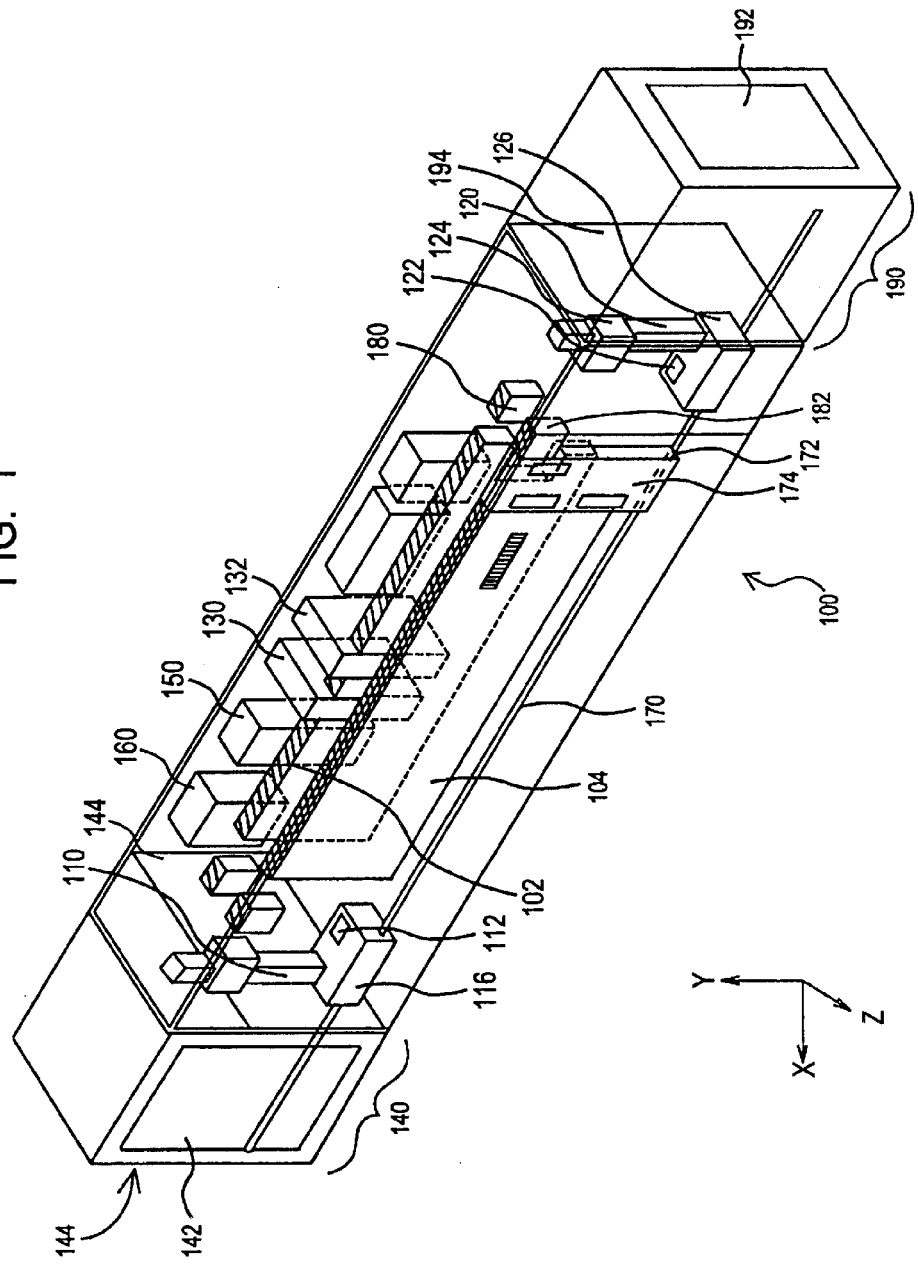
FIG. 1 is a perspective view of Applicant's data storage and retrieval system.

Referring now to FIG. 1, automated data storage and retrieval system 100 is shown having a first wall of storage slots 102 and a second wall of storage slots 104. Portable data storage media are individually housed in one of the various storage slots. In certain embodiments, a data storage medium, such as a magnetic tape, is housed in a portable container, i.e. a cartridge. In certain embodiments, a data storage medium such as a magnetic/optical disk is housed in an appropriate portable container. In certain embodiments, electronic media, such as a PROM, EPROM, EEPROM, Flash PROM, and the like, is housed in an appropriate portable container.

Applicant's automated data storage and retrieval system includes one or more accessors, such as accessors 110 and 120. An accessor is a robotic device which retrieves a portable data storage medium/cartridge from first storage wall 102 or second storage wall 104, transports that accessed medium/cartridge to a data storage device, such as device 130/132, for reading and/or writing data thereon, and returns the medium/cartridge to its proper storage slot. Accessor 110 includes controller 112, lifting servo section portion 114, and carriage portion 116. Accessor 120 includes controller 122, lifting servo section portion 124, and carriage portion 126. Each accessor includes a controller in combination with at least one gripper mechanism. Therefore, each accessor operates independently of the other accessors in the library, thereby eliminating any accessor-related single points of failure.

Figure 2:
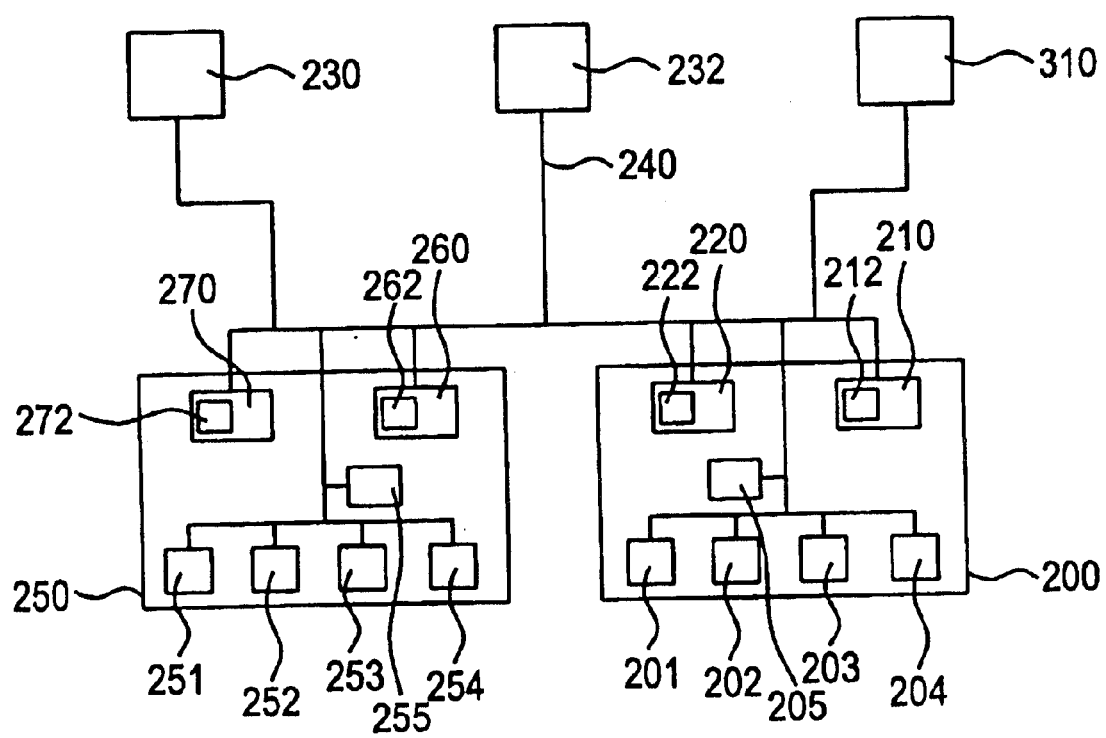
FIG. 2 is a block diagram of Applicants' data storage and retrieval system.
Figure 4B:
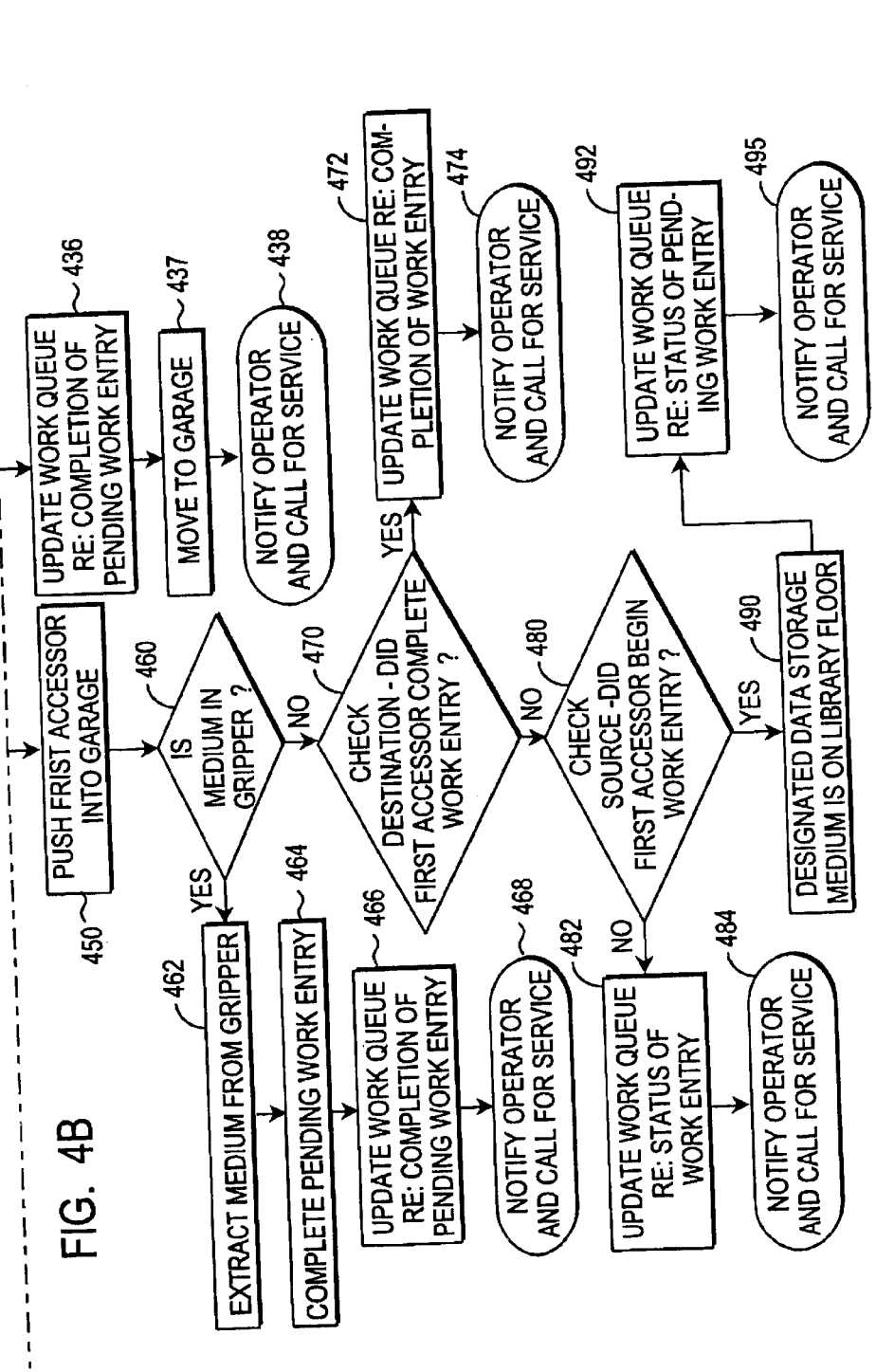
FIG. 4 is a is a flowchart summarizing additional steps in Applicant's method.

Controllers 112 and 122 communicate with one or more host computers, such as host computer 230 (FIG. 2), 232 (FIG. 2), and/or 234 (FIG. 2), via communication link 240 (FIG. 2). Controllers 112 and 122 communicate with data storage devices 130 and 132. In certain embodiments, controllers 112 and 122 communicate with data storage devices 130/132 via a Fibre Channel data and control interconnection. Controllers 112 and 122 communicate with operator input station 150 via communication link 240. In certain embodiments, controllers 112 and 122 communicate with operator input station 150 via a Fibre Channel data and control interconnection. Controller 112 communicates with controller 122 via communication link 240. In certain embodiments, controller 112 communicates with controller 122 via a Fibre Channel data and control interconnection.

Controllers 112 and 122 each includes and maintains an inventory of the portable data storage media disposed in library 100. When a request is made for a certain data storage medium, or a certain volser, controllers 112 and 122 determine where that designated medium/volser is disposed in library 100.

As described in greater detail below, controllers 112 and 122 include and maintain a work queue comprising information regarding each work request provided by one or more host computers, the system operator, or the import/export controller 160. In addition accessor controllers 112 and 122 create a work entry which is stored in their respective work queues for each work request received. Accessor controllers 112 and 122 perform error recovery procedures when required. Accessor controllers 112 and 122 control the operation of their respective accessors.

As shown in FIG. 1, accessors 110 and 120 travel bi-directionally along rail 170 in an aisle disposed between first wall of storage slots 102 and second wall of storage slots 104. As shown in FIG. 1, accessors 110 and 120 are both moveably disposed on rail system 170. U.S. Pat. No. 6,038,490, entitled "Automated Data Storage Dual Picker Interference Avoidance," teaches a method to prevent collisions occurring between accessors moveably disposed on the same rail system, and is hereby incorporated by reference herein.

Operator input station 150 permits a user to communicate with Applicant's automated data storage and retrieval system 100. Power component 180 and power component 182 each comprise one or more power supply units which supply power to the individual components disposed within Applicant's automated data storage and retrieval system.

Import/export station 172 includes access door 174 pivotably attached to the side of system 100. Portable data storage media/cartridge can be added to data storage and retrieval system 100, or in the alternative, removed from the system, via station 172/access door 174. Import/export controller 160 alerts controllers 112 and 122 when a portable data storage medium/cartridge has been either added to library 100, or removed from library 100, via import/export station 172.

In certain embodiments, accessor 110 and/or accessor 120 includes a bar code reader. In certain embodiments, after being notified by controller 160 that a new cartridge/medium has been added to the library via import/export station 172, a work entry is created by the accessor controllers to ascertain identification information about that new cartridge/medium. Thereafter, one of the accessors reads the bar code. In certain embodiments, after being notified that a new cartridge/medium has been added to the library via import/export station 172, an accessor controller causes an accessor to retrieve that new cartridge/medium, transport that new cartridge/medium to a data storage device, removeably insert that new cartridge/medium in the data storage device, and receive information regarding the identity of that new cartridge/medium from the data storage device.

Upon ascertaining identification information about such a new cartridge/medium, i.e. the volser, serial number, etc., the accessor controller examines its current library inventory. In the event the accessor controller determines the new cartridge/medium does not comprise a duplicate of an existing cartridge/medium, then the accessor controller: (i) allocates an available storage slot, (ii) transports the new cartridge/medium to that storage slot, (iii) disposes the new cartridge/medium in that storage slot, (iv) updates its inventory to include that new cartridge/medium, and (v) notifies the other accessor controller(s) regarding the identity and storage slot for that new cartridge/medium.

In certain embodiments, after being notified by the operator or a host that a cartridge/medium is to be removed from the library via import/export station 172, each accessor controller generates a work entry for that removal operation. Thereafter, an accessor retrieves the designated cartridge/medium from its storage cell, inserts that cartridge/medium into a data storage device, such as data storage device 130 (FIG. 1), and verifies that the proper cartridge/medium was retrieved. Thereafter, the accessor transports the designated cartridge/medium to the import/export station. The inventory disposed in each accessor's work queue is then updated to reflect the removal of the designated cartridge/medium from the library. Thereafter, the work queue disposed in each accessor is updated to reflect completion of the work entry.

Garage 140 is disposed at a first end of library 100. In the embodiment shown in FIG. 1, garage 190 is disposed at the second end of library 100. In certain embodiments, Applicant's data storage and retrieval system includes a single garage portion. In certain embodiments, Applicant's data storage and retrieval system includes two or more garage portions. A garage comprises an extension frame of a library with no media or data storage drives disposed therein. Garage 140 and garage 190 are used to house accessors in need of hardware/software upgrades, routine maintenance, and/or repair. Garage 140 includes access door 142 disposed on the front of system 100. Garage 190 includes a door (not shown in FIG. 1), and strike plate 192 disposed in the end portion of garage 190.

Placing an accessor into either garage 140 or garage 190 allows the remaining operational accessors to have full access to all of the media/cartridges disposed in storage slots, or disposed in data drives, or disposed in the import/export station. The out-of-service accessor is placed in the garage which allows performance of mechanical, electrical, and/or software maintenance, repair, and/or upgrade, without requiring that library 100 be taken off-line. Garage 140 includes mechanical barrier 144 that can be installed by a Field Engineer to prevent a second accessor from moving into garage 140 when that garage is being used to service a first accessor. Mechanical barrier 194 can be similarly used in garage 190.

In certain embodiments of Applicants' method to provide failover protection, a non-operational accessor is pushed into a garage portion by an operational accessor. In the event the failed accessor has a portable cartridge/portable data storage medium disposed in one of its gripper mechanisms, then the operational accessor also retrieves that cartridge/medium, and completes the work entry undertaken by the failed accessor.

Figure 7:
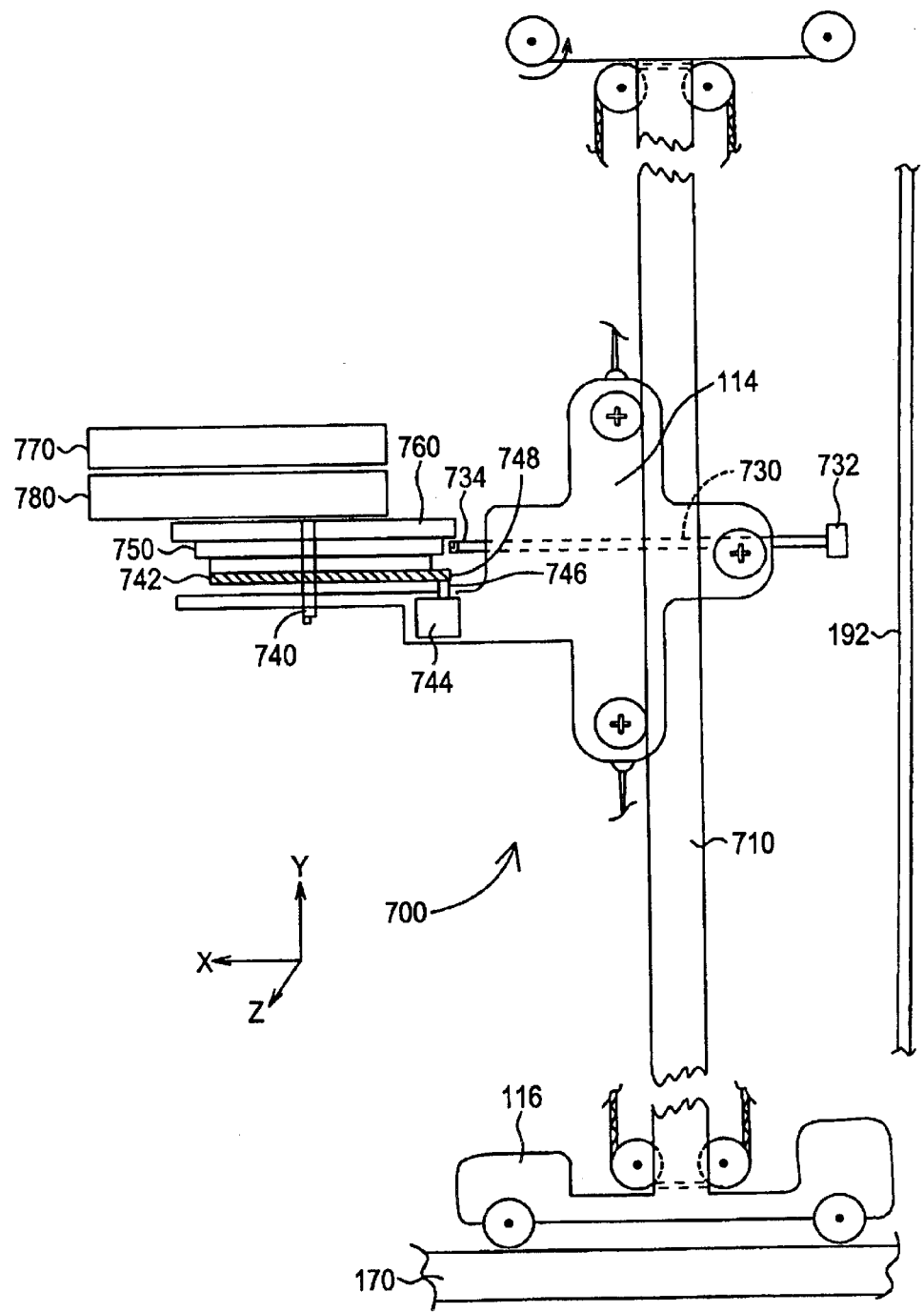
FIG. 7 is a side view of one embodiment of Applicants' accessor.

FIG. 7 shows embodiment 700 of Applicants' accessor. Accessor 700 includes carriage portion 116 (FIG. 1), vertical pillar 710, and lifting servo section portion 114 (FIG. 1). In this embodiment, lifting servo section 114 includes centering plunger 730, gripper mechanism pivot shaft 740, clutch 742, drive motor 744, centering cam 750, gripper mechanism frame 760, first gripper mechanism 770, and second gripper mechanism 780. In normal operation, operation of drive motor 744 causes external shaft 746 to rotate. Gear 748 disposed on the distal end of shaft 746 slidingly engages clutch 742. Centering cam 750 is disposed on the superior surface of clutch 742. Frame 760 is disposed on the superior surface of centering cam 750.

Operation of motor 744 to cause shaft 746 to rotate in a first direction causes centering cam 750 and frame 760 to rotate in a first direction around pivot shaft 740. Rotation of frame 760 in a first direction causes first gripper mechanism 770 and second gripper mechanism 780 to rotate around the Y axis in that first direction. Similarly, operation of motor 744 in a second manner to rotate shaft 746 in a second direction causes first gripper mechanism 770 and second gripper mechanism 780 is rotate in a second direction around the Y axis. Thus, operation of motor 744 allows gripper mechanisms 770/780 to, for example, retrieve cartridges/media from either first storage wall 102 (FIG. 1) or second storage wall 104 (FIG. 1) in library 100.

Referring to FIGS. 1 and 7, Applicant's method includes an error recovery procedure wherein accessor 700 is pushed in the X direction along rail 170 into either garage 140 or garage 190. If, for example, inoperative accessor 700 is pushed in the −X direction into garage 190, when distal end 732 of centering plunger 730 impacts strike plate 192 (FIG. 1), proximal end 734 of centering plunger 730 impacts centering cam 760 causing centering cam 760 to rotate about 90 degrees around pivot shaft 740 such that first gripper mechanism 770 and second gripper mechanism 780 face in the +X direction. With failed accessor 770 in such an orientation, i.e. when first gripper mechanism 770/second gripper mechanism 780 face the +X direction, a second accessor can approach failed accessor 700 along rail 170 (FIG. 1) and retrieve the one or two cartridges/media releaseably attached to first gripper mechanism 770 and/or second gripper mechanism 780.

Figure 8A:
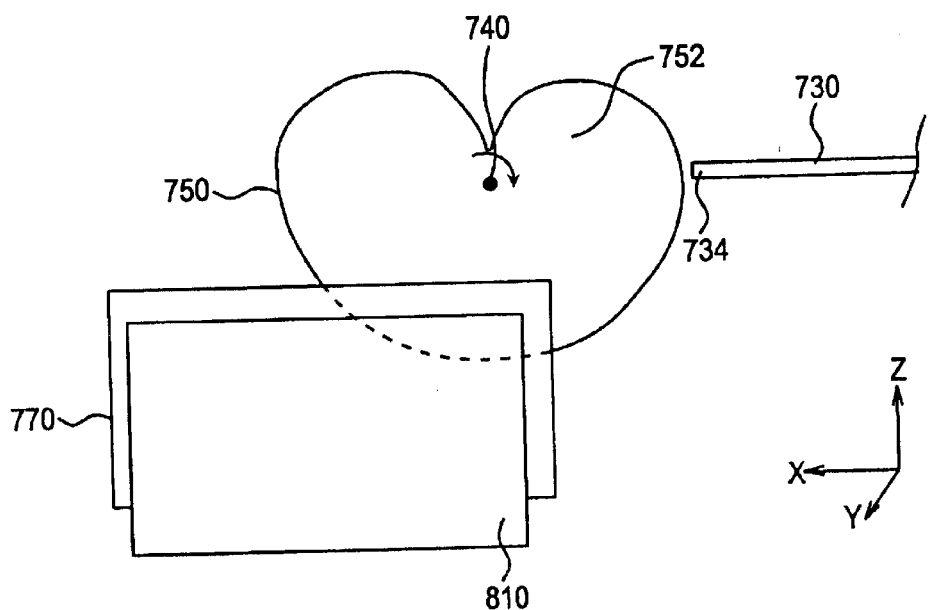
FIG. 8A is a top view of a rotatable cam portion of Applicants' accessor, where that rotatable cam portion is in a first orientation.
Figure 8B:
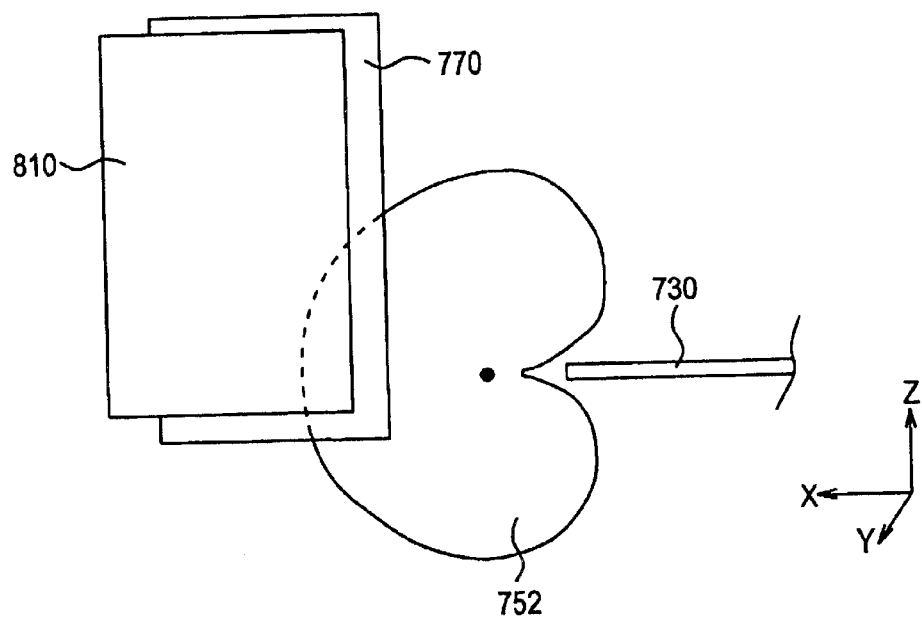
FIG. 8B is a top view of a rotatable cam portion of Applicants' accessor, where that rotatable cam portion is in a second orientation.

For example, in FIG. 8A cartridge/medium 810 is releaseably disposed in gripper mechanism 770. Gripper mechanism 770 is facing in the −Z direction as if cartridge/medium 810 had been retrieved, for example, from first storage wall 102 (FIG. 1), or from data drive 130, or from data drive 132. When distal end 734 of centering plunger 730 strikes first circular portion 752 of centering cam 750, cam 750 is caused to rotate in the clockwise direction around pivot shaft 740 into the orientation shown in FIG. 8B. In the orientation of FIG. 8B, gripper mechanism 770 faces in the +X direction. An accessor approaching gripper mechanism 770 along rail 170 (FIG. 1) can retrieve cartridge medium 810 from gripper mechanism 770. Thereafter, normal operations of the failed accessor are restored, for example, by the system operator.

Figure 9A:
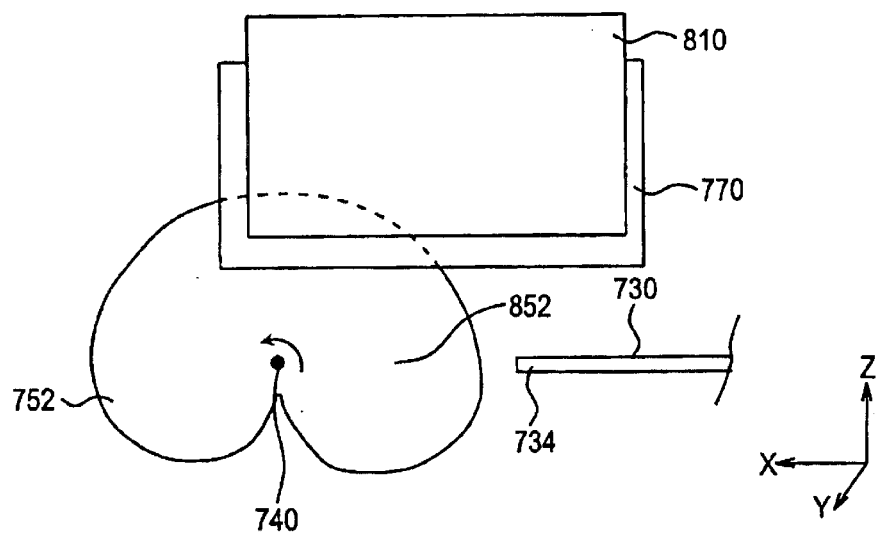
FIG. 9A is a top view of a rotatable cam portion of Applicants' accessor, where that rotatable cam portion is in a third orientation.
Figure 9B:
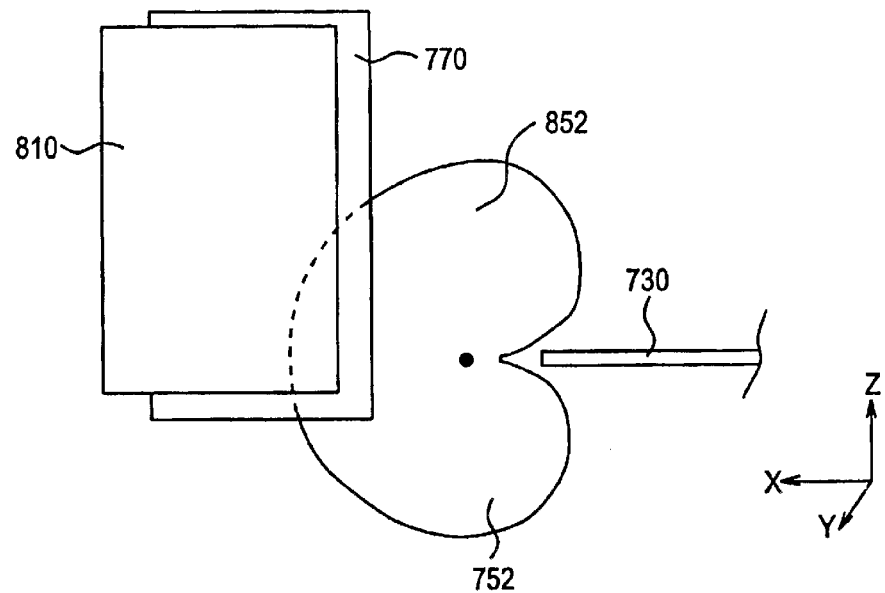
FIG. 9B is a top view of a rotatable cam portion of Applicants' accessor, where that rotatable cam portion is in the second orientation.

Similarly, in FIG. 9A cartridge/medium 810 is releaseably disposed in gripper mechanism 770, where gripper mechanism 770 is facing in the +Z direction as if cartridge/medium 810 had been retrieved, for example, from second storage wall 104 (FIG. 1) or from export/import station 172. When distal end 734 of centering plunger 730 strikes second circular portion 852 of centering cam 750, cam 750 is caused to rotate in the counterclockwise direction around pivot shaft 740 into the orientation shown in FIG. 9B. In the orientation of FIG. 9B, gripper mechanism 770 faces in the +X direction. An accessor approaching gripper mechanism 770 along rail 170 (FIG. 1) can retrieve cartridge/medium 810 from gripper mechanism 770. In the orientations shown in both FIGS. 9A and 9B, the gripper mechanism can be subsequently restored to the normal Z position by, for example, operation of motor 774, or manually by the system operator.

FIG. 2 shows data library 200, data library 250, host computer 230, host computer 232, and host computer 234. Data library 200 includes accessor 210 and accessor 220. Data library 200 further includes data storage devices 201, 202, 203, and 204. Data library 200 further includes import/export station 205.

Accessor 210 includes accessor controller 212. Accessor 210 is configured similarly to accessor 110/120 shown in FIG. 1, i.e. accessor 210 includes a carriage portion and a lifting servo section portion. In certain embodiments, accessor controller 212 is disposed on the carriage portion of accessor 210. In certain embodiments, accessor controller 212 is disposed on the lifting servo section portion of accessor 210. In certain embodiments, portions of accessor controller 212 are disposed on both the carriage portion and the lifting servo section portion of accessor 210.

Accessor 220 includes accessor controller 222. Accessor 220 is configured similarly to accessor 110/120 shown in FIG. 1, i.e. accessor 220 includes a carriage portion and a lifting servo section portion. In certain embodiments, accessor controller 222 is disposed on the carriage portion of accessor 220. In certain embodiments, accessor controller 222 is disposed on the lifting servo section portion of accessor 220. In certain embodiments, portions of accessor controller 222 are disposed on both the carriage portion and the lifting servo section portion of accessor 220.

Data library 250 includes accessor 260 and accessor 270. Data library 250 further includes data storage devices 251, 252, 253, and 254. Data library 250 further includes import/export station 255.

Accessor 260 includes accessor controller 262. Accessor 260 is configured similarly to accessor 110/120 shown in FIG. 1, i.e. accessor 260 includes a carriage portion and a lifting servo section portion. In certain embodiments, accessor controller 262 is disposed on the carriage portion of accessor 260. In certain embodiments, accessor controller 262 is disposed on the lifting servo section portion of accessor 260. In certain embodiments, portions of accessor controller 262 are disposed on both the carriage portion and the lifting servo section portion of accessor 260.

Accessor 270 includes accessor controller 272. Accessor 270 is configured similarly to accessor 110/120 shown in FIG. 1, i.e. accessor 270 includes a carriage portion and a lifting servo section portion. In certain embodiments, accessor controller 272 is disposed on the carriage portion of accessor 210. In certain embodiments, accessor controller 272 is disposed on the lifting servo section portion of accessor 270. In certain embodiments, portions of accessor controller 272 are disposed on both the carriage portion and the lifting servo section portion of accessor 270.

Data and control interconnection 240 interconnects each host computer to each accessor moveably disposed in libraries 200 and 250. Data and control interconnection 240 interconnects each host computer to each data storage drive disposed in library 200 and 250. Data and control interconnection 240 interconnects accessor controller 212 and accessor controller 222. Data and control interconnection 240 interconnects accessor controller 262 and accessor controller 272.

In certain embodiments, data and control interconnection 240 comprises a Fibre Channel architecture. As those skilled in the art will appreciate, Fibre Channel ("FC") is a high-speed serial data transfer interface that can be used to connect systems and storage in point-to-point or switched topologies. Fibre Channel Arbitrated Loop (FC-AL), developed with storage connectivity in mind supports copper media and loops containing up to 126 devices, or nodes. FC-AL loops are hot-pluggable and tolerant of failures.

In certain Fibre Channel architecture embodiments, Applicant's data and control interconnection 240 supports bandwidths such as 133 Mb/sec., 266 Mb/sec., 532 Mb/sec., 1.0625 Gb/sec. In certain embodiments, interconnection 240 supports bandwidths as high as 4 Gb/sec. at distances of up to ten kilometers. In embodiments using a Gigabit Fibre Channel architecture, data and control interconnection achieves a data rate of 100 MB/sec. (200 MB/sec. fall-duplex) after accounting for overhead. The Fibre Channel architecture described above is presented as an exemplary embodiment, and should not be construed as limiting.

In certain embodiments, Applicant's Fibre Channel embodiment of data and control interconnection 240 comprises a layered protocol architecture consisting of up to about five layers, the highest defining mappings from other communication protocols onto the FC fabric. Such other communication protocols supported include the Small Computer System Interface ("SCSI") protocols and the internet protocol ("IP"). These supported protocols can be used simultaneously. For example, an FC-AL loop running IP and SCSI protocols can be used for both system-to-system and system-to-peripheral communication, sharing a communication path that is as fast as most mainframe backplanes. This capability eliminates the need for separate I/O controllers, reduces costs, reduces cabling complexity, and reduces board count.

Applicant's data and control interconnection 240 comprises a high-reliability interconnection. Data and control interconnection 240 is robust enough to allow multiple devices, such as accessors, host computers, and/or data storage devices, to be removed from the loop at one time with no interruption in data transfer. In certain embodiments, data and control interconnection attaches sophisticated error detecting codes to each packet of data. These codes are checked by the receiver of the data, which requests a re-send if there is any discrepancy.

In certain embodiments, data and control interconnection 240 further includes a switch unit not shown in FIG. 2. In certain embodiments, data and control interconnection 240 further includes a communication hub not shown in FIG. 2. In certain embodiments, data and control interconnection 240 further includes a communication director not shown in FIG. 2.

Host systems 230, 232, and 234, comprise computer systems, such as one or more mainframe computers, one or more workstations, and one or more personal computers, and the like, and combinations thereof. Each such computer system includes an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, each such host computer system further includes storage management program 395 (not shown in FIGS.) to manage the transfer of data to/from a library, such as library 200 and/or library 250. Such a storage management program may include the IBM DFSMS implemented in the IBM MVS operating system. The IBM DFSMS software is described in "DFSMS/MVS V1R4 General Information," IBM document no. GC26-4900-05, published by IBM (Copyright 1997, IBM), which publication is incorporated herein by reference in its entirety. Such storage management software maintains information regarding the library wherein a particular volume serial number cartridge/medium is located. Such storage management software also includes information regarding the read/write resources available in each of the attached libraries.

Figure 6:
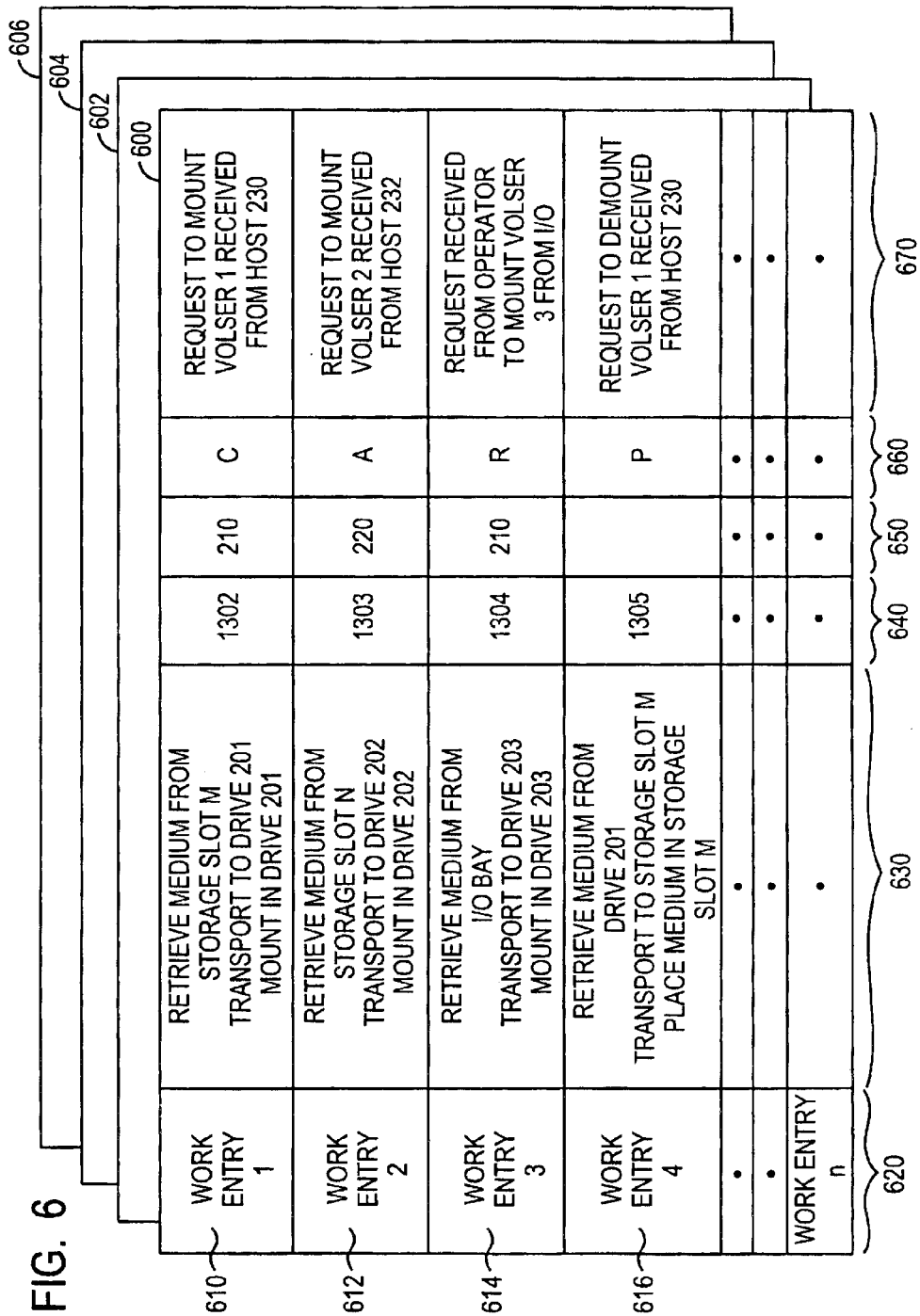
FIG. 6 is a block diagram showing the contents of the database of work entries disposed within each of Applicant's accessors.

Each accessor, sometimes called a "cartridge mover," moveably disposed in Applicant's library includes a work queue disposed in that accessor's controller. FIG. 6 shows work queue 600 which comprises, for example, the work queue disposed in controller 212 (FIG. 2). FIG. 6 also shows work queues 602, 604, and 606, which comprise, for example, the work queues disposed in controllers 222 (FIG. 2), 262 (FIG. 2), and 272 (FIG. 2), respectively. The work queues disposed in the various accessor controllers in one library, such as library 200, do not include information regarding work requests provided to the accessor controllers disposed in a different library, such as library 250. Therefore, work queues 600 and 602 are identical and recite work entries for library 200, and work queues 604 and 606 are identical and recite work entries for library 250. Work queues 600/602 differ, however, from work queues 604/606.

Work queue 600 comprises a database which includes rows corresponding to work requests received, in combination with columns which contain information specific to each such work request. Work requests may be received from an attached host computer, or from the system operator via operator input station 150 (FIG. 1), or from the import/export controller 160 (FIG. 1). After receiving a work request, each accessor controller in the library generates a corresponding work entry. Column 670 of work queue 600 recites both the work request and the source of that work request. After receiving such a work request, each accessor controller generates a corresponding work entry, which includes columns 620, 630, 640, 650, and 660. Information in column 650 is entered when an accessor accepts that respective work entry.

Column 620 includes the identification numbers assigned to each work request. Column 630 recites, for each work entry, the individual operations required to complete that work entry. Column 640 includes the time each work request was received. Column 650 includes the identification of the accessor handling each work request. Each accessor moveably disposed in Applicant's data storage and retrieval system is assigned a unique accessor identifier. Column 660 includes information regarding the status of each work request. The status of any given work entry comprises, for example, an "A" meaning that work entry is active, a "C" meaning that work entry is completed, an "R" meaning that work entry is in an error recovery mode, a "PE" means a work entry is not completed because a permanent error condition exists, and a "P" meaning that work entry remains pending, i.e. remains available. By permanent error, Applicants mean an error that was not recoverable by the automated media storage library and requires manual intervention.

For example, row 610 of work queue 600 recites information regarding Work Entry 1. Work Entry 1 comprises a request from host computer 230 to mount volser 1. Work Entry 1 was received at 1302 hours. Work Entry 1 was completed by accessor 210. In order to complete Work Entry 1, accessor controller 212: (i) identified the portable data storage cartridge/medium corresponding to volser 1, (ii) caused accessor 210 to retrieve that designated cartridge/medium, (iii) selected an available data storage device, such as device 201, (iv) caused accessor 210 to transport the designated cartridge/medium to data storage device 201, and (v) caused accessor 210 to insert that designated cartridge/medium in data storage device 201.

As new work entries are received, information related to each such pending work entry is entered into the work queue disposed in each accessor disposed in the library. As an accessor completes one work entry, that accessor then ascertains the next pending work entry on its queue. As any one accessor executes a particular work entry, that accessor periodically reports the status of that work entry to each of the other accessors moveably disposed in that library. For example, as accessor 210 (FIG. 2) executes a work entry received, for example, from host 230 (FIG. 2), accessor 210 updates accessor 220 (FIG. 2) regarding the status of that work entry.

Applicant's invention includes a method to provide failover protection to a data storage and retrieval system in the event of a failure of an accessor moveably disposed therein. By failure of an accessor, Applicant means less than acceptable performance of one or more operations by that accessor. Applicant's method provides transparent recovery in the event such a failure occurs during execution of a pending work entry. By transparent recovery, Applicant means the requesting host computer is not made aware that a particular accessor failed to complete a pending work entry/work request. Rather, another operational accessor moveably disposed in same library ascertains the nature of the failure, and then undertakes certain error recovery procedures to complete the pending work entry. In certain embodiments, one or more my host computers can examine the work queue disposed in the accessors moveably disposed in the one or more libraries to which those one or more host computers are attached.

Referring now to FIG. 3, in step 310 a host computer requests the mount/demount of a designated portable data storage medium. In certain embodiments, such as in a tape library, the designated portable data storage medium is disposed in a portable cartridge. In step 320, the work request of step 310 is provided to each accessor controller disposed in the library storing the designated data storage medium.

In step 330, each accessor controller in the library creates a pending work entry comprising, inter alia, the individual operations required to complete the work request. For example, a work request to "mount" a designated cartridge/medium may require the successful completion of more than one operation. For example, a request to mount a cartridge/medium may require: (i) ascertaining the location of that designated cartridge/medium, (ii) retrieving that designated cartridge/medium from its storage slot, (iii) selecting an appropriate data storage device, (iv) transporting the designated cartridge/medium to the selected data storage device, and (v) inserting the designated cartridge/medium into the selected data storage device. These discrete operations comprise part of the work entry created to undertake and complete the work request. The accessor controller disposed in each accessor creates such a work entry, and stores that work entry in the accessor controller's work queue.

In step 340, one of Applicant's accessors, i.e. a first accessor, completes a prior work entry, updates the other accessors, i.e. one or more remaining accessors, regarding the completion of that prior work entry, examines its work queue, and determines that the pending work entry is available. Further in step 340, that first accessor initiates that pending work entry, and notifies the other accessor moveably disposed in the library that the first accessor is undertaking the pending work entry. In step 350, the other accessors acknowledge the first accessor's notification. In step 360, each accessor updates its work queue to indicate that the pending work entry is now "active," and that the first accessor is handling that pending work entry.

In step 370, the first accessor initiates the pending work entry. In step 380, that first accessor periodically reports its operational status, and the status of the pending work entry, to the other accessors in the library. Applicant's method then transitions to step 410.

In certain embodiments of Applicants' method, where two or more of Applicants' accessors are disposed in a library, those two or more accessors periodically contact one another such that each accessor monitors the operational status of each of the other accessors disposed in that library. In other embodiments of Applicants' method, Applicants' accessors only communicate with one another to report the status of an active work entry.

Figures 5, 5A:
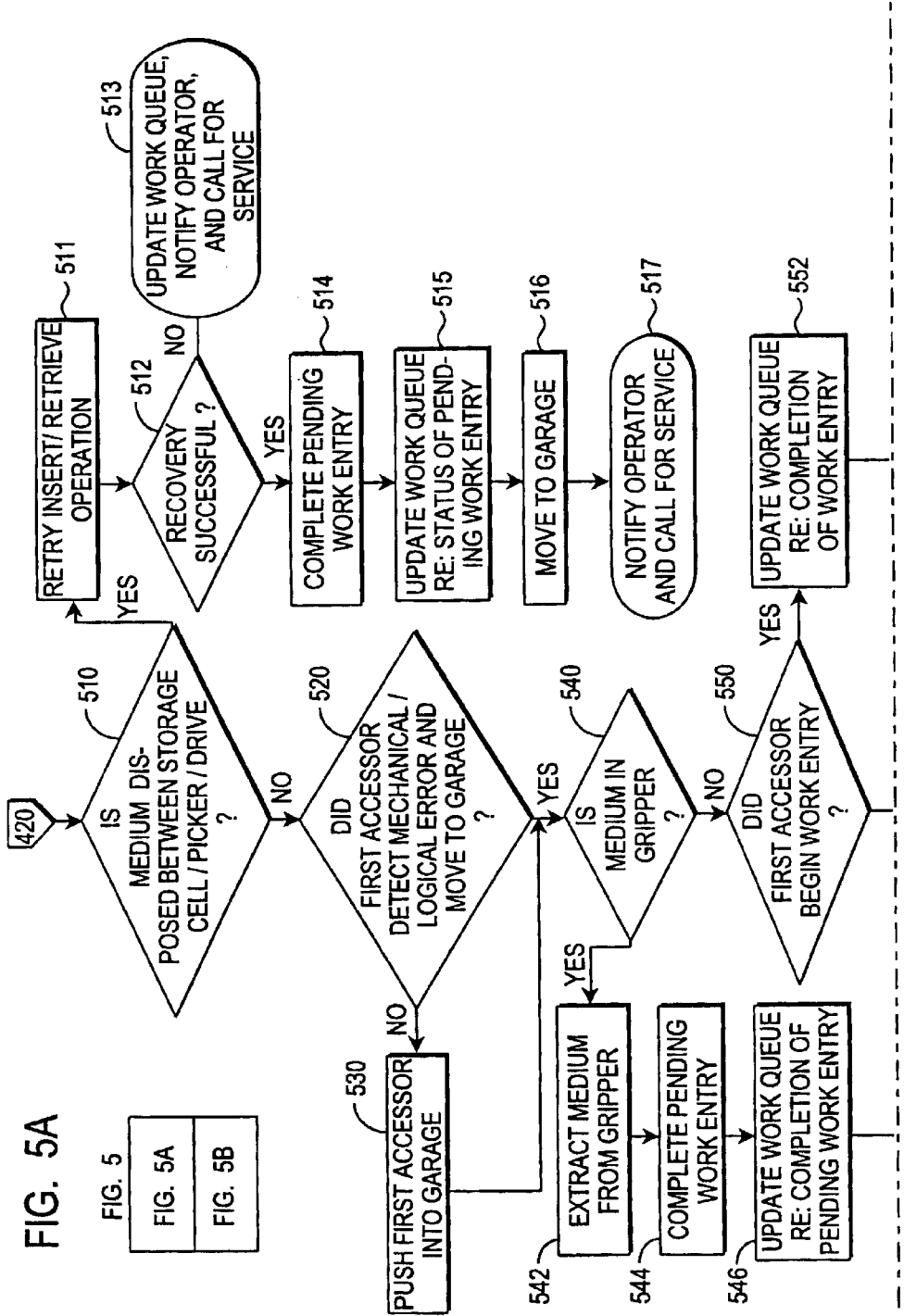
FIG. 5 is a flowchart summarizing additional steps in Applicant's method.

In step 410 each of the other accessors in the library determines if the first accessor has reported successful completion of the pending work entry. In the event the first accessor reports such successful completion, then in step 415 each accessor updates its respective work queue to indicate that the pending work entry is completed. On the other hand, if it is determined in step 410 that the first accessor has not reported a successful completion, then each of the other accessors determines in step 420 if the first accessor is still in communication. If the first accessor is still in communication with the other accessors, but has not completed the pending work entry, then Applicant's method transitions to step 510 (FIG. 5).

If in step 420 it is determined that the first accessor is not in communication with the other accessors, then in step 430 Applicants' method determines if the designated medium/cartridge is disposed between the gripper mechanism on the first accessor and either a storage slot or a data storage drive. If the designated medium/cartridge is "jammed," then in step 431 the first accessor reattempts the failed insertion/retrieval operation. Each retry involves moving the gripper mechanism disposed on the first accessor a few millimeters, right/left/up/down, in an attempt to free the jammed medium/cartridge.

If the insertion/retrieval operation of step 431 is successfully, then in step 435 the first accessor completes the pending work entry. In step 436, the first accessor notifies, if possible, the remaining accessors that the work entry has been successfully completed, but that a permanent error exists, and the work queue of each accessor controller is updated to reflect a "C" status for the work entry. Thereafter in step 437 the first accessor is moved to a garage. In step 438, the system operator is notified regarding the insertion/retrieval error, and a call is made for service.

If the jammed medium/cartridge was not inserted/retrieved in step 431, then in step 433 the work queue in each accessor is updated to reflect a "PE" status for the pending work entry. In step 434, the system operator is notified regarding the failure of the first accessor, and a call for service is made. In certain embodiments, one or more of the controllers disposed on one or more operational accessors makes the service request. In certain embodiments, the system operator makes the service request.

If it is determined in step 430 that the designated medium/cartridge is not "jammed," then in step 440 the work queue of each operational accessor is updated to reflect an error recovery status for the pending work entry. In step 450, one of the remaining accessors, i.e. a second accessor, pushes the failed first accessor into a garage portion of the data storage and retrieval system.

In step 460, the second accessor determines if the designated medium/cartridge is disposed in the gripper mechanism of the first accessor. In the event the medium/cartridge is disposed in that gripper mechanism, then in step 462 the second accessor undertakes error recovery procedures discussed above to extract that medium/cartridge from the gripper mechanism disposed in the first accessor. In step 464, the second accessor completes the work entry. In step 466, the second accessor notifies the other operational accessors that the work entry is completed, and the accessor controllers in each of those operational controllers update their respective work queues to reflect a "completed" status for that work entry. In step 468, the system operator is notified of the error, and a call for service is made. In certain embodiments, the second accessor controller makes the service request. In certain embodiments, one or more of the controllers disposed on one or more operational accessors makes the service request. In certain embodiments, the system operator makes the service request.

In the event the second accessor determines in step 460 that the designated medium/cartridge is not disposed in the gripper mechanism disposed on the first accessor, then the second accessor undertakes error recovery procedures to determine the location of that medium/cartridge. In step 470, the second accessor checks the destination location for that medium/cartridge. The destination location may comprise a storage slot, a data storage device, or the import/export station. In the event the designated medium/cartridge is found at the destination location, then in step 472 the work queue in each operational accessor is updated to reflect a "completed" status for the work entry. In step 474, the system operator is notified regarding the failure of the first accessor, and call for service is made. In certain embodiments, the second accessor controller makes the service request. In certain embodiments, one or more of the controllers disposed on one or more operational accessors makes the service request. In certain embodiments, the system operator makes the service request.

In the event the designated medium/cartridge is not found at the destination location recited in the work queue, then in step 480 the second accessor checks the source location recited in its work queue for the designated medium/cartridge. That source location may comprise, for example, a storage slot, a data storage device, or the import/export station. In the event the designated medium/cartridge is found at the source location, then in step 482 the work queue in each operational accessor is updated to reflect a "pending" status for the work entry.

In the event the designated medium/cartridge is not found in step 480 at the source location, then in step 490 the accessor controller disposed on the second accessor determines that the medium/cartridge has likely fallen to the floor, and the work queue in each accessor is updated to reflect a "PE" status for the pending work entry. In step 495, the system operator is notified of the error.

Referring now to FIG. 5, in the event the first accessor has not reported the successful completion of a pending work entry, and if that first accessor can still communicate with the other accessors in the library, then Applicant's method transitions to step 510 from step 420.

If in step 510 the first accessor reports that the designated medium/cartridge is disposed between the accessor's gripper mechanism and a storage cell or data storage device, i.e. the medium/cartridge is "jammed," then in step 511 the first accessor reattempts several times to perform the failed insertion/retrieval operation. Each retry involves moving the gripper mechanism a few millimeters, right/left/up/down, in an attempt to free the jammed medium/cartridge. If it is determined in step 512 that the insertion/retrieval operation was successfully completed, then in step 514 the first accessor completes the pending work entry. In step 515, the work queue of each accessor is updated to reflect a "PE" status, i.e. to indicate that the work entry is completed and that a permanent error with respect to the first accessor nevertheless exists.

Thereafter in step 516, the first accessor is moved to a garage portion for service. In step 517, the system operator is notified that the first accessor requires service, and a call for service is made. In certain embodiments, the first accessor's controller makes the service request. In certain embodiments, one or more of the controllers disposed on one or more of the remaining accessors make the service request. In certain embodiments, the system operator makes the service request.

If on the other hand, it is determined in step 512 that the jammed medium/cartridge was not inserted/retrieved in step 511, then in step 513, the system operator is notified of the error, the work queue in each accessor is updated to reflect a "PE" status for the pending work entry, and a call for service is made. In certain embodiments, the second accessor controller makes the service request. In certain embodiments, the first accessor's controller makes the service request. In certain embodiments, one or more of the controllers disposed on one or more of the remaining accessors make the service request. In certain embodiments, the system operator makes the service request.

If in step 510 the medium is not disposed between a storage cell and the first accessor, or between a data storage device and the first accessor, and if the first accessor reports that it detects either a logical or mechanical error that precludes completion of the pending work entry, then in step 520 Applicants' method determines if the first accessor has moved to a garage. In the event the failed first accessor has not moved to a garage portion of the library, then in step 530 one of the remaining accessors, i.e. a second accessor, pushes the first accessor into a garage. In step 540, the first accessor controller reports whether the designated medium/cartridge is releaseably attached to the first accessor's gripper mechanism.

In the event the designated medium/cartridge is releaseably disposed on the first accessor, then in step 542 one of the remaining accessors, i.e. a second accessor, undertakes error recovery procedures to extract the designated medium/cartridge from the first accessor. Those error recovery procedures are described above in conjunction with FIGS. 7, 8A, 8B, 9A, and 9B. In step 544, the second accessor completes the pending work entry. In step 546, the work queues disposed in each accessor moveably disposed in the library are updated to show a completed status for the work entry. In step 548, the system operator is notified regarding the failure of the first accessor, and a call for service is made. In certain embodiments, the first accessor's controller makes the service request. In certain embodiments, one or more of the controllers disposed on one or more of the remaining accessors make the service request. In certain embodiments, the system operator makes the service request.

In the event the first accessor in step 550 reports successful completion of the pending work entry and also reports a failure, then in step 552 the work queues disposed in each accessor moveably disposed in the library are updated to show a completed status for the work entry. In step 554, the system operator is notified regarding the failure of the first accessor, and a call for service is made. In certain embodiments, the first accessor's controller makes the service request. In certain embodiments, one or more of the controllers disposed on one or more of the remaining accessors make the service request. In certain embodiments, the system operator makes the service request.

In the event the first accessor in step 560 reports a failure that precludes initiation of the pending work entry, then in step 562 the work queues disposed in each accessor moveably disposed in the library are updated to show a pending status for the work entry. In step 564, the system operator is notified regarding the failure of the first accessor, and a call for service is made. In certain embodiments, the first accessor's controller makes the service request. In certain embodiments, one or more of the controllers disposed on one or more of the remaining accessors make the service request. In certain embodiments, the system operator makes the service request.

In the event in step 570 the first accessor reports that the designated cartridge/medium has fallen to the floor, then in step 580 the work queue in each accessor is updated to reflect a "PE" status. In step 590, the system operator is notified that the designated cartridge/medium has fallen to the floor, and a call for service is made. In certain embodiments, the first accessor controller makes the service request. In certain embodiments, one or more of the controllers disposed on one or more remaining accessors makes the service request. In certain embodiments, the system operator makes the service request.

Figure 10:
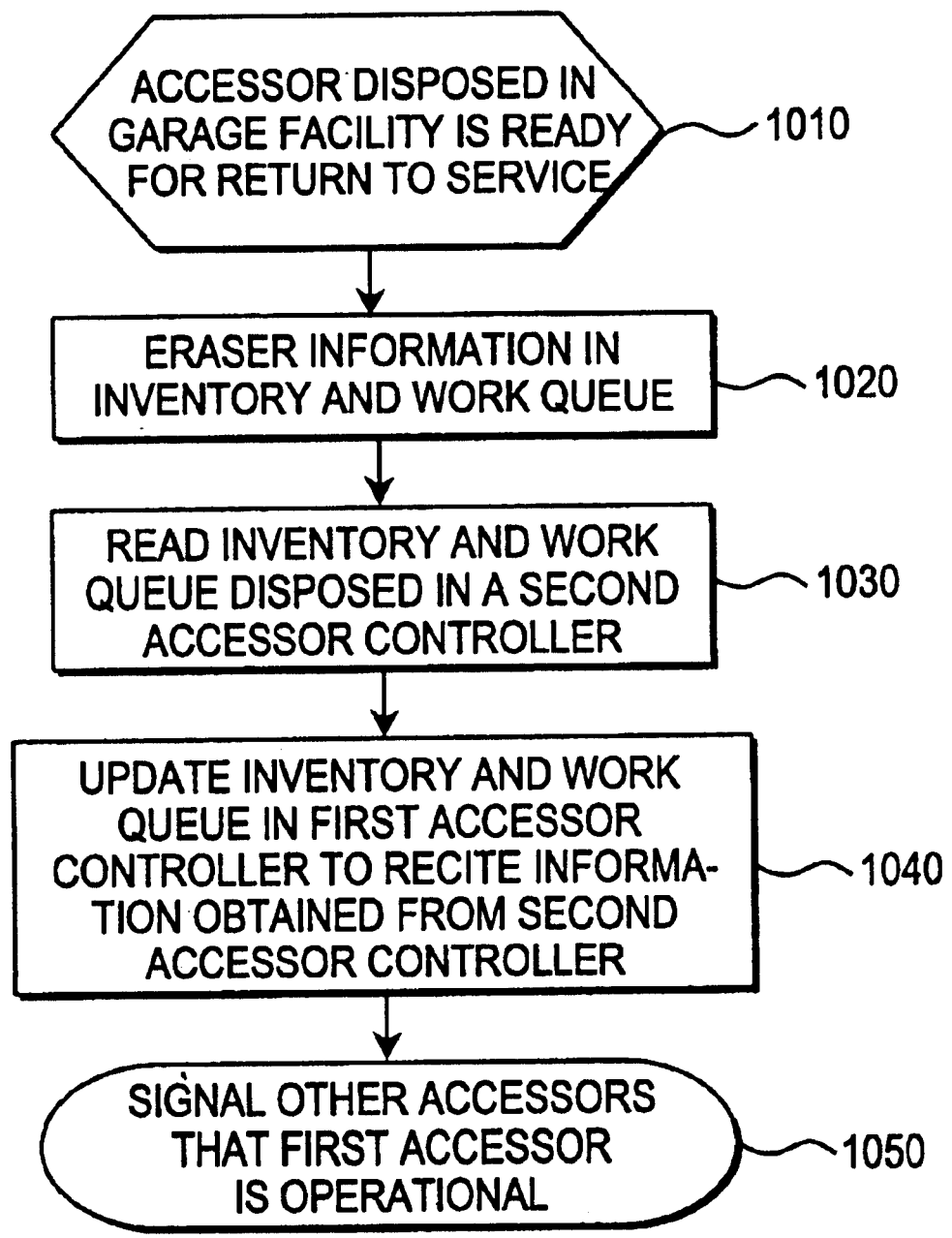
FIG. 10 is a flowchart summarizing the steps in Applicants' method to return Applicants' accessor to service in Applicants' data storage and retrieval system.

To return an off-line accessor to service after repair/maintenance/upgrade requires careful synchronization of that accessor's inventory and work queue with the inventories and work queues disposed in the other accessors in that library. FIG. 10 summarizes the steps of Applicants' method to return a first accessor to service.

In step 1010, an accessor disposed in the garage portion of Applicants' data storage and retrieval system, i.e. a first accessor, is to be returned to service. In step 1020, a portion of memory disposed in that first accessor controller is erased. More specifically, information comprising that first accessor controller's library inventory and work queue is erased in step 1020. In step 1030, the first accessor controller reads the library inventory/work queue disposed in one of the remaining accessors, i.e. a second accessor, moveably disposed in the same library. In step 1040, the first accessor controller updates its directory/work queue to include the information obtained from the second accessor controller. In step 1050, the first accessor controller signals the other accessor controllers that the first accessor is once again operational and in service.

Applicants' invention includes a data storage and retrieval system comprising a computer useable medium having computer readable program code disposed therein for providing failover protection to Applicants' data storage and retrieval system in the event of a failure of one of Applicants' accessors moveably disposed in that system. The programming of the present invention may comprise a computer program product embodied as program code stored in a storage device, such as a magnetic disk drive or memory, etc., in a computer, or may comprise an article of manufacture, such as a CD ROM, magnetic tape, etc.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to provide failover protection in a data storage and retrieval system in the event of an accessor failure, wherein said data storage and retrieval system includes a garage, one or more portable data storage media, two or more moveable accessors, and two or more accessor controllers, wherein said two or more accessors can communicate with one another, and wherein each of said two or more accessors comprises an accessor controller and a work queue stored in that accessor controller, and wherein said two or more accessors include a first accessor and one or more remaining accessors, said method comprising the steps of:

providing a work request to each of said two or more accessors;

creating by each of said two or more accessor controllers a pending work entry comprising said work request;

adding said pending work entry to the work queue stored in each of said two or more accessor controllers;

communicating a notification from said first accessor to said one or more remaining accessors that said first accessor is initiating said vending work entry;

acknowledging said notification by each of said remaining accessors;

determining if said first accessor reports completion of said vending work entry;

determining if said first accessor can communicate with said one or more remaining accessors;

determining if said first accessor has completed said pending work entry; and determining if said first accessor has a portable data storage medium releaseably attached thereto.

2. The method of claim 1, wherein said first accessor has completed said pending work entry, and wherein said first accessor does not have a portable data storage medium releaseably attached thereto, said method further comprising the steps of:

pushing said first accessor into said garage using a second accessor, wherein said second accessor comprises one of said one or more remaining accessors;

updating the work queue disposed in each of said remaining accessors to indicate that said pending work entry is completed; and providing an error message.

3. The method of claim 1, wherein said pending work entry has not been completed, and wherein said first accessor does not have a data storage medium releaseably attached thereto, further comprising the steps of:

pushing said first accessor into said garage using a second accessor, wherein said second accessor comprises one of said one or more remaining accessors;

updating the work queue disposed in each of said remaining accessors to indicate that said pending work entry remains pending; and providing an error message.

4. The method of claim 1, wherein said pending work entry has not been completed, and wherein said first accessor has a portable data storage medium releaseably attached thereto, further comprising the steps of:

pushing said first accessor into said garage using a second accessor, wherein said second accessor comprises one of said one or more remaining accessors;

extracting said portable data storage medium from said first accessor using said second accessor;

completing said pending work entry;

communicating the completion of said pending work entry to each of said one or more remaining accessors;

updating the work queue disposed in each of said one or more remaining accessors to indicate that said pending work entry is completed; and providing an error message.

5. The method of claim 4, wherein said first accessor further comprises:

a lifting servo section;

a centering cam disposed on said lifting servo section;

a centering plunger, wherein said centering plunger has a first end and a second end, and wherein said first end extends outwardly from said lifting servo section and said second end is disposed adjacent said centering cam;

said method further comprising the steps of:

impacting said centering cam with said centering plunger; and rotating said centering cam about 90 degrees.

6. The method of claim 1, wherein said pending work entry includes retrieving a designated one of said one or more portable data storage media, further comprising the steps of:

repositioning said first accessor;

attempting to retrieve said designated portable data storage medium;

determining if said designated portable data storage medium was successfully retrieved;

operative if said designated portable data storage medium was successfully retrieved, completing said pending work entry using said first accessor; and operative if said designated portable data storage medium was not successfully retrieved, providing an error message that said designated portable data storage medium was not retrieved.

7. The method of claim 1, wherein said data storage and retrieval system further comprises a data storage device, and wherein pending work entry includes inserting a designated one of said one or more portable data storage media in said data storage device, said method further comprising the steps of:

repositioning said first accessor;

attempting to insert said designated portable data storage medium in said data storage device;

determining if said designated portable data storage medium was successfully inserted in said data storage device; and operative if said designated portable data storage medium was not successfully inserted in said data storage device, providing an error message.

8. The method of claim 1, wherein said first accessor has a portable data storage medium releaseably attached thereto, further comprising the steps of:

extracting said data storage medium from said first accessor using one of said one or more remaining accessor;

completing said pending work entry;

updating said work queue to indicate that said pending work entry is completed; and providing an error message.

9. The method of claim 1, wherein said first accessor has a data storage medium releaseably attached thereto, further comprising the steps of:

detecting by said first accessor a logical error;

communicating said logical error to each of said remaining accessors:

moving said first accessor to said garage;

operative if said pending work entry has been completed, updating said work queue to indicate that said pending work entry is completed;

operative if said vending work entry has not been completed, updating said work queue to indicate that said pending work entry remains pending;

extracting said data storage medium from said first accessor using one of said one or more remaining accessors;

completing said pending work entry;

updating said work queue to indicate that said pending work entry is completed; and providing an error message.

10. The method of claim 1, wherein said pending work entry comprises retrieving a designated portable data storage medium from a source location and disposing that designated portable data storage medium in a destination location, further comprising the steps of:

determining if said designated portable data storage medium is releaseably attached to said first accessor;

operative if said designated portable data storage medium is not releaseably attached to said first accessor, determining if said designated portable data storage medium is disposed in said source location;

operative if said designated portable data storage media is not releaseably attached to said first accessor, and if said designated portable data storage medium is not disposed in said source location, determining if said designated portable data storage medium is disposed in said destination location;

operative if said designated portable data storage media is not releaseably attached to said first accessor, and if said designated portable data storage medium is not disposed in said source location, and if said designated portable data storage medium is not disposed in said destination location, determining that said designated portable data storage medium is on the floor of said data storage and retrieval system; and providing an error message to the system user.

11. A data storage and retrieval system comprising a computer useable medium having computer readable program code disposed therein to provide failover protection in a data storage and retrieval system, wherein said data storage and retrieval system includes a garage, one or a plurality of portable data storage media, two or more moveable accessors, two or more accessor controllers, wherein said two or more accessors can communicate with one another, wherein each of said two or more accessors comprises an accessor controller and a work queue stored in that accessor controller, and wherein said two or more accessors include a first accessor and one or more remaining accessors, the computer readable program code comprising a series of computer readable program steps to effect:

providing a work request to each of said two or more accessors;

creating by each of said two or more accessor controllers a pending work entry comprising said work request;

adding said pending work entry to the work queue stored in each of said two or more accessor controllers;

communicating a notification from said first accessor to said one or more remaining accessors that said first accessor is initiating said pending work entry;

acknowledging said notification by each of said remaining accessors;

determining if said first accessor reports completion of said pending work entry; and determining if said first accessor can communicate with said one or more remaining accessors;

determining if said first accessor has completed said pending work entry; and determining if said first accessor has a portable data storage medium releaseably attached thereto.

12. The data storage and retrieval system of claim 11, said computer readable program code further comprising a series of computer readable program steps to effect:

pushing said first accessor into said garage;

updating the work queue disposed in each of said remaining accessors to indicate the status of said pending work entry; and providing an error message.

13. The data storage and retrieval system of claim 12, said computer readable program code further comprising a series of computer readable program steps to effect:

extracting said portable data storage medium from said first accessor using one of said one or more remaining accessors;

completing said pending work entry;

communicating the completion of said pending work entry to each of said remaining accessors;

updating the work queue disposed in each of said one or more remaining accessors to indicate that said pending work entry is completed; and providing an error message.

14. The data storage and retrieval system of claim 11, wherein said pending work entry includes retrieving a designated one of said one or a plurality of data storage media, said computer readable program code farther comprising a series of computer readable program steps to effect:

repositioning said first accessor;

attempting to retrieve said designated portable data storage medium;

determining if said designated portable data storage medium was successfully retrieved;

operative if said designated portable data storage medium was successfully retrieved, completing said pending work entry using said first accessor; and operative if said designated portable data storage medium was not successfully retrieved, providing an error message that said designated portable data storage medium was not retrieved.

15. The data storage and retrieval system of claim 11, wherein said data storage and retrieval system further comprises a data storage device, and wherein pending work entry includes inserting a designated one of said one or a plurality of data storage media in said data storage device, said computer readable program code further comprising a series of computer readable program steps to effect:

repositioning said first accessor;

attempting to insert said designated portable data storage medium in said data storage device;

determining if said designated portable data storage medium was successfully inserted; and operative if said designated portable data storage medium was not successfully inserted, providing an error message.

16. The data storage and retrieval system of claim 11, wherein said first accessor further comprises:

a lifting servo section;

a centering cam disposed on said lifting servo section;

a centering plunger, wherein said centering plunger has a first end and a second end, and wherein said first end extends outwardly from said lifting servo section and said second end is disposed adjacent said centering cam;

wherein said computer readable program code further comprises a series of computer readable steps to effect causing said centering cam to impact said centering plunger.

17. The data storage and retrieval system of claim 11, wherein said pending work entry comprises retrieving a designated portable data storage medium from a source location and disposing that designated portable data storage medium in a destination location, wherein said computer readable program code further comprises a series of computer readable steps to effect:

determining if said designated portable data storage medium is releaseably attached to said first accessor;

operative if said designated portable data storage medium is not releaseably attached to said first accessor, determining if said designated portable data storage medium is disposed in said source location;

operative if said designated portable data storage media is not releaseably attached to said first accessor and if said designated portable data storage medium is not disposed in said source location, determining if said designated portable data storage medium is disposed in said destination location;

operative if said designated portable data storage media is not releaseably attached to said first accessor and if said designated portable data storage medium is not disposed in said source location and if said designated portable data storage medium is not disposed in said destination location, determining that said designated portable data storage medium is on the floor of said data storage and retrieval system; and providing an error message to the system user.

* * * * *